Oct. 26, 1971   A. C. BARNEBL ET AL   3,615,023
CENTERING DEVICES FOR ENDLESS FILTER BELT
Original Filed Jan. 25, 1968   5 Sheets-Sheet 1
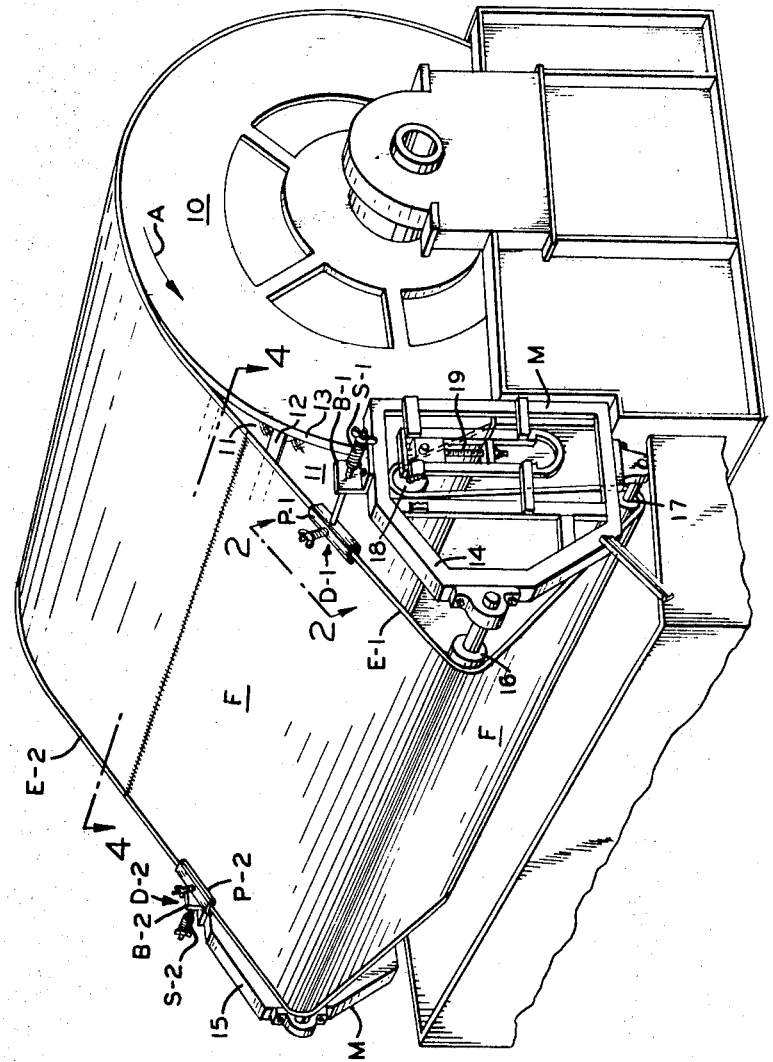
AUGUST C. BARNEBL
FRANZ BLIEM
ERNEST R. KUS
INVENTORS.
BY Theodore M. Jablon
ATTORNEY.

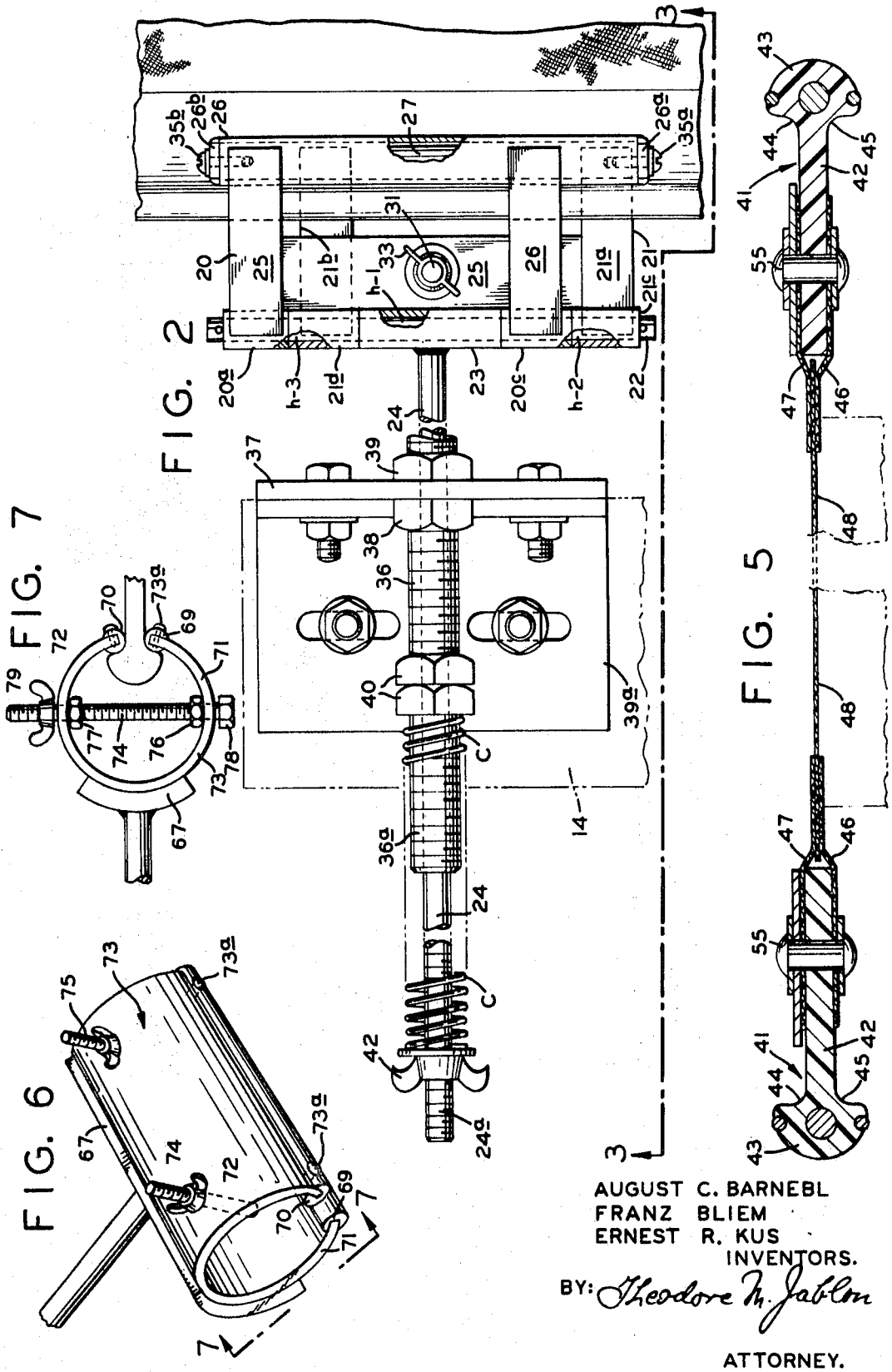

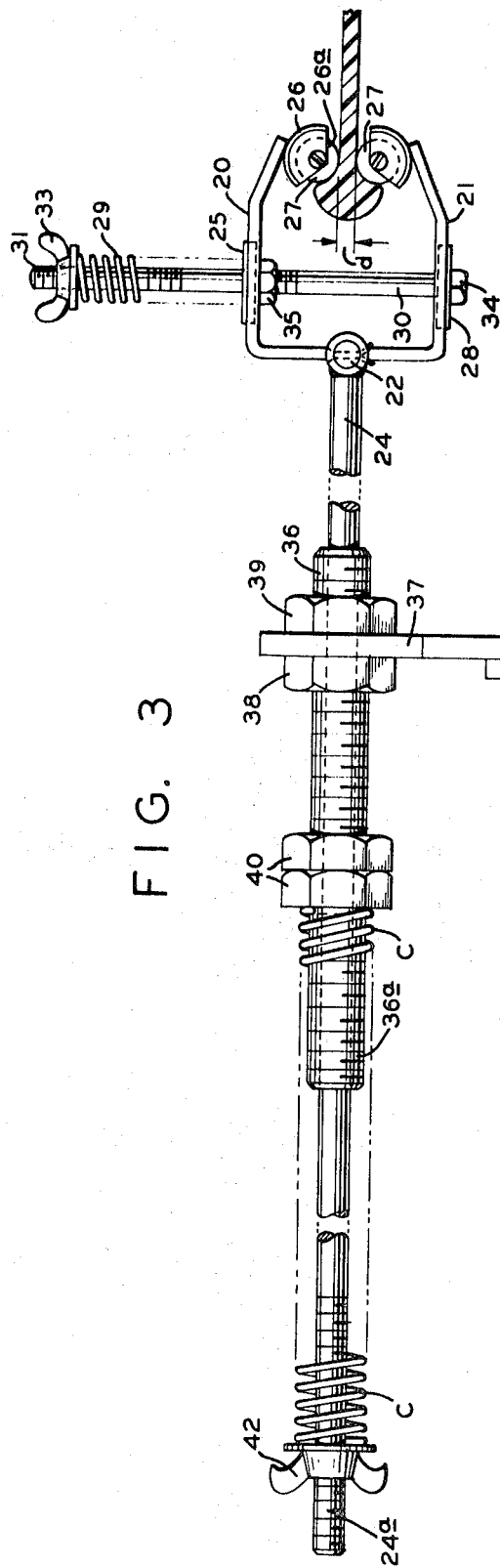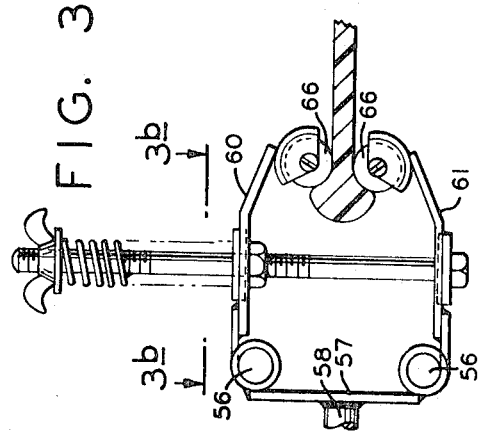

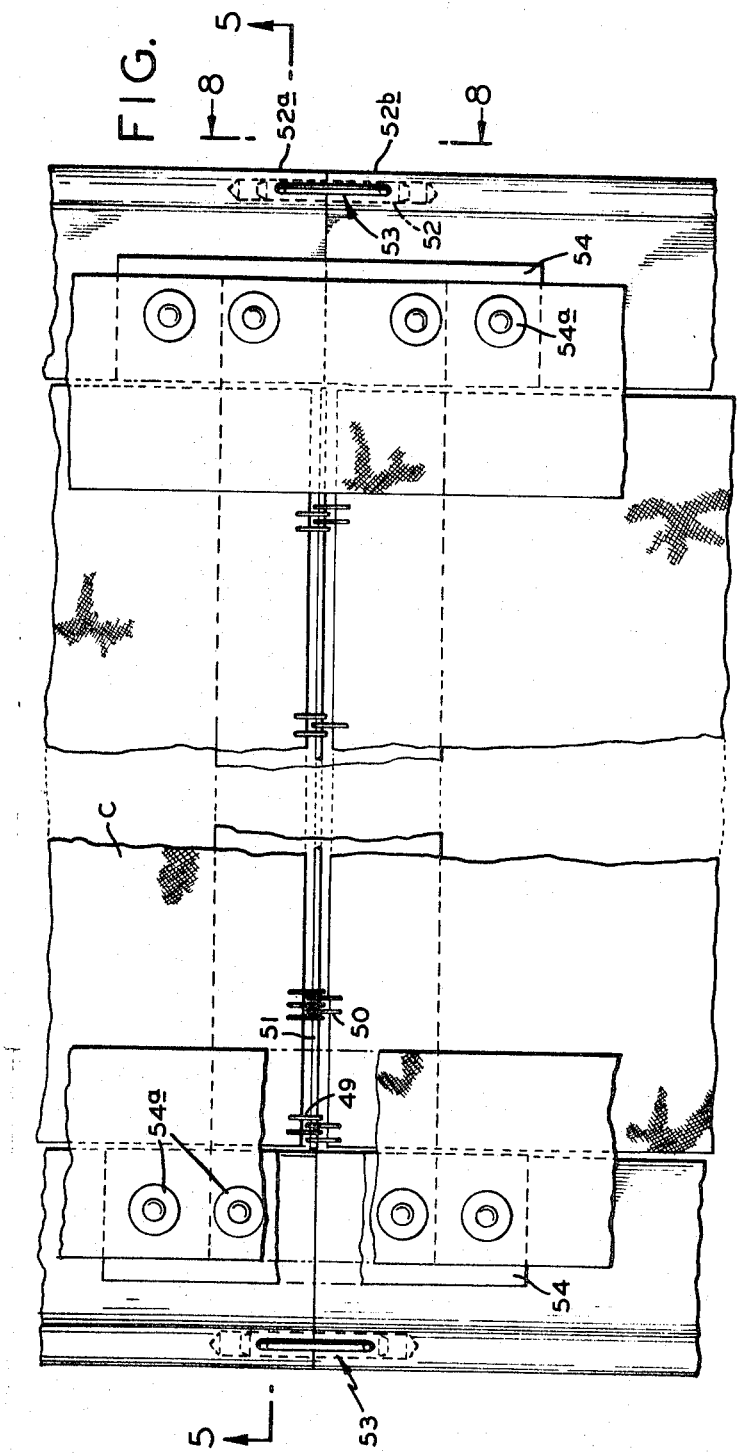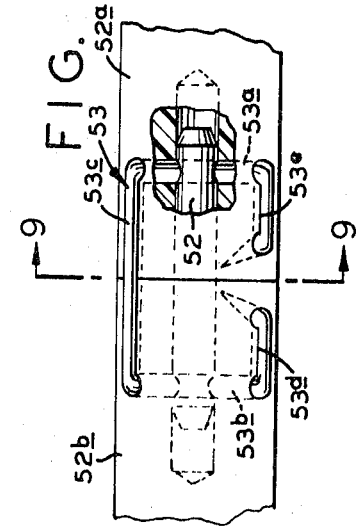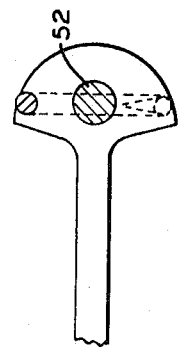

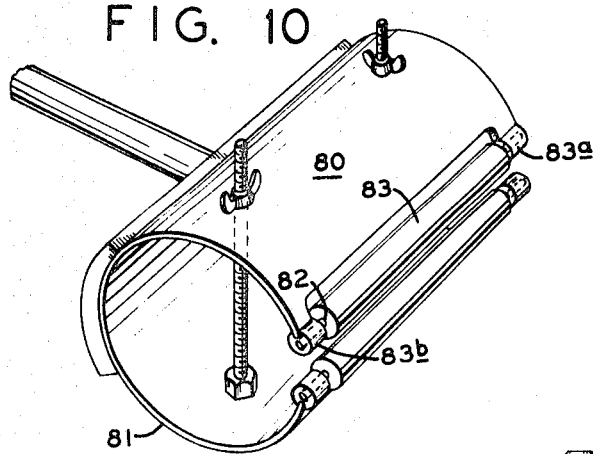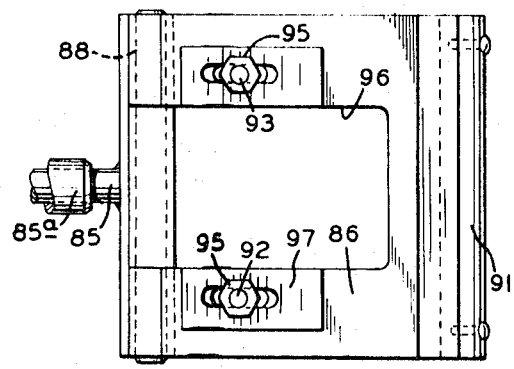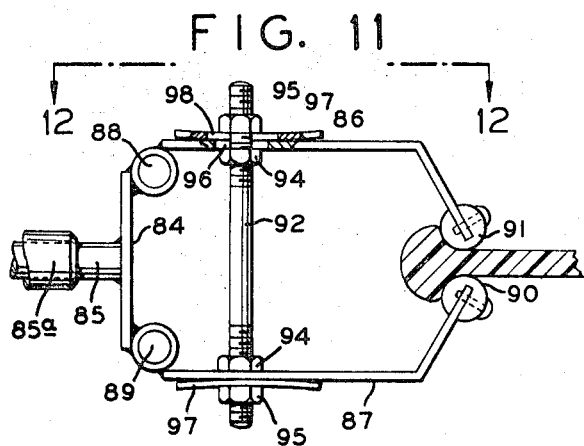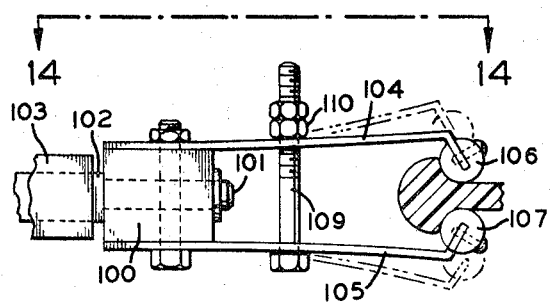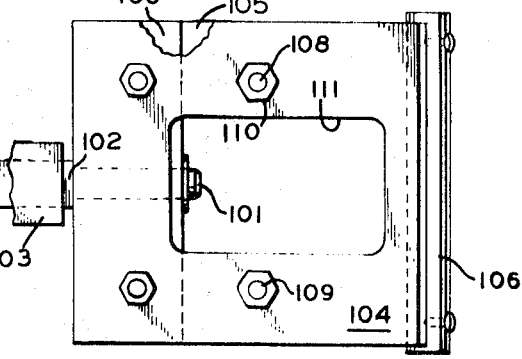

United States Patent Office 3,615,023
Patented Oct. 26, 1971

3,615,023
CENTERING DEVICES FOR ENDLESS FILTER BELT
August C. Barnebl, Stamford, and Franz Bliem and Ernst R. Kus, Norwalk, Conn., assignors to Dorr-Oliver Incorporated, Stamford, Conn.
Original application Jan. 25, 1968, Ser. No. 700,579, now Patent No. 3,503,517, dated Mar. 31, 1970. Divided and this application Nov. 19, 1969, Ser. No. 870,551
Int. Cl. B01d 33/14
U.S. Cl. 210—401                3 Claims

ABSTRACT OF THE DISCLOSURE

A pair of oppositely arranged belt centering devices for belt type vacuum drum filter apparatus, engaging respective side edge portions of the filter belt, each such device featuring a pair of glide shoes slidably engaging oppositely arranged tracks on the filter belt, the devices themselves being biased away from each other and from the side edges of the belt so that between them they exert a transverse stretch upon the filter media, also featuring specially molded flexible strip elements providing the tracks at the edges of the belt, and connector means for securing the ends of the strip to one another.

---

This is a division of patent application Ser. No. 700,-579 now Pat. No. 3,503,517 issued Mar. 31, 1970.

This invention relates to rotary drum filters of the type that is equipped with an endless travelling filter belt. More particularly this relates to the so-called belt tracking devices for keeping the filter belt centered relative to the filter drum, that is to say in alignment against a tendency towards lateral shifting or wandering of the belt relative to the filter drum.

In this travelling belt type filter unit, a horizontal drum is mounted on a support structure with drive means for rotating the drum through a filtration cycle, with the lower portion of the drum immersed in a bath of slurry. An endless travelling filter belt of porous filter material surrounds and engages a major portion of the circumference of the drum so that the belt is moved by the rotation of the drum, the filter being effective to collect and hold a layer or cake of slurry solids from the bath to be discharged from the filter belt in the course of the filtration cycle. Auxiliary devices are provided for guiding the filter belt away from the upper portion of the drum to effect discharge of the cake material from the belt and then back onto the lower portion of the drum where the layer of solids is collected from the bath.

The invention is concerned with improvements in tracking devices of the type that exert a transverse stretch upon the filter belt by engaging bead-shaped lateral edge portions of the belt at the cake delivery side of the filter drum, in such a manner that the filter belt is at once kept wrinkle free as well as in substantial center alignment with the drum. An example of such tracking devices is presented in the U.S. patent to Petersen No. 3,077,990 which discloses oppositely arranged tensioning devices engaging the respective edge portions by means of rollers engaging the beads at both sides of the filter belt.

The invention provides tensioning devices cooperating with the beads or edge portions of the filter belt in such a manner as to minimize or largely eliminate wear and tear of the edge portions of the belt, or possibly severing the bead which may occur due to the action of the roller upon the bead or welt, and due to the effect of a concentrated stretching force upon the bead.

Therefore, the invention provides tensioning- or stretching devices each of which has a pair of oppositely arranged glide shoes of substantial length engaging the bead, with the filter medium between them, so that the stretching force is distributed along the length of the shoes. Friction between the glide shoes and the beads is minimized by special construction of the tension device and of the beads. Accordingly, the beads are provided by a strip element of flexible material edge-wise connected to the filter media of the belt. This strip element may be of rubber or the like, preferably a flange portion co-planar with the filter media and secured thereto along the length thereof, and an enlarged portion providing a bead formed with a pair of oppositely arranged track faces along the length of said flange portion at each side thereof. The tracks engaged by the respective glide shoe members present a glide contact surface of a material preferably having a low coefficient of friction relative to the material of the bead. The tracks are preferably shaped concavely in cross-section, conforming to the configuration of the glide shoes retaining the bead between them against a transverse belt-stretching force. The glide shoes may be spring-biased towards one another.

That is to say, interconnecting structure between the glide shoes is such as to maintain the glide shoes substantially parallel to one another and in operating engagement with said tracks. A rod extends from the interconnecting structure in a direction laterally away from the glide shoes and from the filter belt.

A support bracket structure fixed relative to the vat, has rigidly mounted thereon a guide tube for the rod. Resilient bias means or spring means urging the stem or rod in axial direction in said tube and away from the side of the filter belt, impart the transverse stretching force to the filter belt while the same is moving past the shoes.

The construction of the device may be such as to allow for the glide shoes to release the belt edge portion or tracks in case the transverse stretching force upon the filter belt due to lateral deviations exceeds a predetermined maximum.

Features of this invention are found in the construction of the tensioning or stretching devices, as well as in the construction of the filter belt, and in the manner of cooperation of the tensioning devices with the filter belt. Other features lie in the safety means providing for release of the filter belt from the glide shoes of the tensioning devices. Still other features lie in the provision of novel locking means interconnecting the mutually abutting ends of the strips which constitute the beaded edges of the filter belt.

Other features and advantages will hereinafter appear.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

FIG. 1 is a perspective view of a belt type rotary vacuum drum filter, showing the belt tensioning devices engaging the prepared edge portions of the filter belt.

FIG. 2 is a greatly enlarged plan view of the belt tensioning device taken on line 2—2 in FIG. 1.

FIG. 3 is a side view of the tensioning device taken on line 3—3 in FIG. 2, showing belt gripping members hinged together and biased towards each other.

FIG. 3a is a fragmentary side view similar to FIG. 3, showing a different hinge arrangement.

FIG. 3b is a plan view taken on line 3b—3b in FIG. 3a.

FIG. 4 is a fragmentary plan view of the filter belt taken on line 4—4 in FIG. 1, showing a locking device for the bead end portion of the track strip elements.

FIG. 5 is a cross-section of the filter belt taken on line 5—5 in FIG. 4, showing the profile of the prepared longitudinal edge portion of the filter belt, including beaded guide track strip element.

FIG. 6 is a perspective view of a different construction of the belt gripping part of the tensioning device, showing the glide shoes carried by resiliently yieldable belt-gripping elements.

FIG. 7 is an end view of the device of FIG. 5, taken on line 7—7 thereof.

FIG. 8 is a view taken on line 8—8 in FIG. 4, further showing the locking device, including a centering pin and securing means therefor.

FIG. 9 is a sectional view taken on line 9—9 in FIG. 8 showing the intersection of the centering pin and the securing means therefor.

FIG. 10 shows the perspective view of FIG. 6 modified with respect to the glide shoe members.

FIG. 11 is a side view of another embodiment of the belt-gripping part, having resiliently yieldable belt-gripping elements.

FIG. 12 is a plan view taken on line 12—12 in FIG. 11.

FIG. 13 is a side view of still another embodiment of the belt gripping part having resiliently yieldable belt-gripping elements.

FIG. 14 is a plan view taken on line 14—14 in FIG. 13.

As shown in the perspective view of FIG. 1, the belt-stretching and belt-centering devices D–1 and D–2 of this invention are mounted opposite each other upon the sides of the frame M of a drum filter unit of generally known construction. The devices D–1 and D–2 have gripping and sliding engagement with the respective prepared longitudinal edge portion or guide tracks E–1 and E–2 of an endless filter belt F. The belt-gripping parts P–1 and P–2 of these devices are mounted in support brackets B–1 and B–2 respectively, and are biased or resiliently urged in opposite directions, that is transversely of and laterally away from the respective edge portion of the belt, as indicated by respective compression coil springs S–1 and S–2. The transverse stretch eliminates longitudinal wrinkles from the belt while also centering the same in relation to the filter drum.

The porous filter belt surrounds and frictionally engages the major portion of the circumference of a filter drum 10 mounted for rotation in the direction of arrow A upon a vat V containing a bath of slurry to be filtered. The filter drum with its lower portion immersed in the slurry bath may be of conventional type, that is equipped with conventional filtration panels or filtrate chambers 11 arranged side by side around the periphery of the drum. These filter panels or vacuum chambers are separated from each other by division strips 12 flush with the peripheral edge portions 13 of the filter drum.

The operation of such a vacuum filter drum in a conventional filtration cycle is of itself well known, controlled by the usual trunnion valve here not shown.

The drum being rotated in the direction of arrow A by usual drive mechanism not shown, moves the filter belt through the slurry bath, so it will continuously collect and hold a layer or cake of slurry solids from the bath while filtrate liquid is delivered from the filter panels through and from the interior of the drum. The cake is then continuously removed from the filter belt at a cake discharge station spaced from the drum, in the course of the filtration cycle. A guide roll system for the filter belt comprises guide rolls parallel to the drum axis, mounted in lateral bracket structures 14 and 15 rigidly connected to the slurry tank or vat. In this way the filter belt is guided away from the upper portion of the drum to effect the discharge of the cake material from the belt, and then back onto the lower portion of the drum where the layer of solids is collected from the bath by the vacuum suction of the filter panels.

The guide roll system may comprise three rolls, namely a first or cake discharge roll 16, a second or idler roll 17, and a third or belt tension roll 18. Each end of the tension roll 18 is vertically adjustable for correcting the tension individually for each side edge portion of the filter belt as by means of well known vertical screw spindles indicated at 19.

The belt tensioning- or stretching device of this invention in the embodiment of FIGS. 2, 3, 3a, 3b, has a movable belt gripping part which comprises a pair of oppositely arranged hinge members 20 and 21 interconnected by a hinge shaft 22. The intermediate portion h–1 of this hinge shaft is held in a sleeve 23 rigidly connected to a rod or stem 24 extending at right angles outwardly therefrom. The hinge members are swingable on the end portions h–2 and h–3 of this shaft. The upper hinge member 20 consists of a pair of arms 25 and 26, the inner ends of which are rigidly connected to respective sleeves 20a and 20b having a loose fit on the shaft, and a cross bar 25 rigidly interconnecting the arms. The outer ends of the arms are rigidly connected to a cylindrical half shell 26 extending parallel to the hinge axis. The half shell has transverse end plates 26a and 26b which hold between them an elongate cylindrical glide shoe member 27 the axis of which is parallel to the hinge axis. For antifriction purposes, and example of a suitable material to constitute these glide shoe members is a composition material known as "Teflon," to slidingly cooperate with rubber guide tracks on the filter belt. This composition material is otherwise definable as carbon tetra-fluoride.

The lower hinge member 21 is substantially similar to the companion member 20, except that the arms 21a and 21b are staggered with respect to the arms of the upper member, in order to accommodate sleeve members 21c and 21d on the hinge shaft 22. The arms 21a and 21b have a cross bar 28 which together with cross bar 25 provides the mounting for a compression spring 29 of adjustable pressure means urging the hinge members towards each other.

The pressure means in this embodiment comprise a bolt 30 extending through the cross bars 25 and 28 and thus transversely of the two hinge members. The threaded end portion 31 of the bolt is surrounded by the compression coil spring 29 confined between the hinge member 20 and a wing nut 33. The head 34 of the bolt and an abutment nut 35 determine the thus adjustable distance d between the glide shoe members 27. Axial pins or screws 35a hold the glide shoe members in place and parallel to the hinge axis.

The rod or stem 24 is slidable in a supporting sleeve 36 extending through a vertical bracket plate 37, which sleeve has an external thread so that lock nuts 38 and 39 on the thread may hold the sleeve fixed to the bracket plate. The bracket plate is bolted to a bracket base 39a in such a manner as to be vertically adjustable thereon. The bracket base in turn is bolted to the bracket structure 14 on the vat in such a manner as to be horizontally adjustable thereon due to the provision of slots 39b.

Another compression coil spring C surrounds the threaded end portion 24a of stem 24 as well as the adjoining end portion 36a of the supporting sleeve. This spring is confined between an adjustable abutment as presented by a pair of lock nuts 40 on the threaded sleeve end portion 36a, and a wing nut 42 on the threaded end portion 24a of the stem.

The glide shoes 27 of the tensioning devices D–1 and D–2 engage the prepared longitudinal edge portions of the endless filter belt, with springs C of the devices acting in opposite directions so as to apply a transverse unwrinkling stretch to the filter media of the filter belt while also centering the belt relative to the filter drum.

To cooperate with the glide shoes 27 of the stretching devices as illustrated in FIGS. 2, 3, the filter belt is provided with a specially prepared edge portion comprising a strip element 41 (see FIG. 5) of homogeneous flexible material, for instance rubber or the like. This strip element comprises a flange portion 42 lengthwise secured to the filter media along the length thereof and co-planar therewith. The outer edge of this flange portion is enlarged to form a bead 43 providing a pair of guide tracks 44 and 45 engaged by, and in profile conforming to the glide shoe members 27.

The flange portion 42 is interposed between a pair of strips 46 and 47 of fabric or filter media material which may be secured to the flange portion by sewing. These strips in turn have between them the respective edge of the filter media 48 proper, to which they may be secured by sewing.

The endless filter belt comprises a length of filter media the ends of which are detachably joined to one another by conventional belt connector means comprising rows of wire loops 49 and 50 coupled by a transverse wire 51. The ends of the edge portions of the filter belt, that is the bead end portions of the track strip elements, are secured to one another by means of a locking device (shown particularly in FIGS. 4, 8, 9) in a manner that is highly stress-resistant while providing a smooth transition and track continuity between these bead end portions even while maintaining them in substantially abutting relationship to one another.

Accordingly, this locking device comprises a centering pin 52 extending longitudinally into the mutually adjoining bead end portions 52a and 52b. A locking wire or clip 53 interlocks with the pin, thus securing the connection. More in particular, this locking wire has two parallel shank portions 53a and 53b extending transversely through the respective end portions of the centering pin. An intermediate wire portion 53c parallel to the bead interconnects the shank portions, which latter have terminal portions 53d and 53e bent over towards each other and so shaped that their pointed ends penetrate into the respective bead end portion.

The abutting ends of the strip element may be additionally secured to one another as by a thin and preferably flexible connector plate 54 fastened to the flange portion of the strip as indicated by rivets 54a.

The belt-gripping part of the stretching devices in the embodiment of FIG. 3a comprises a pair of parallel hinge shafts 55 and 56 mounted on the respective upper and lower ends of a plate 57 fixed to a stem or rod 58. The intermediate part of each hinge shaft is held in a sleeve member 59 fixed to the plate.

A pair of opposedly arranged hinge members 60 and 61 may be identical each comprising a pair of sleeves 62 and 63 loosely fitted over the end portions of the respective hinge shafts. A pair of arms 64 and 65 extend rigidly from the respective sleeves, with glide shoes 66 connected to the outer ends of these arms, substantially the same as those shown in the embodiment of FIG. 3.

The two hinge members 60 and 61 again are urged towards one another in the manner substantially the same as in FIG. 3.

In the embodiment of FIGS. 6 and 7, the belt-gripping part of the stretching device comprises an elongate body portion 67 fixed to a rod or stem 68. Glide shoes 69 and 70 are mounted on the free ends of respective opposedly arranged wing portions 71 and 72 consisting of a springy sheet material, and fixed substantially symmetrically to said body portion 67. As herein shown, these wing portions may be provided by a length of tube 73 of suitable springy material slitted lengthwise and transversely spread sufficiently to accommodate the glide shoe members fastened to the longitudinal edges of the slit, as well as to accommodate the thickness of edge portion of the filter belt.

The glide shoe members may be secured to the wing portions or edges of the slitted tube by means of pins or rivets 73a.

A pair of bolts 74 and 75 extend transversely through this slitted tube, and with nuts 76 and 77 they provide the means for adjusting the spread or distance between the glide shoe members. That is to say, the spread is variable by moving the nuts 76 and 77 upon the threaded bolt either closer towards each other, or farther away from each other. The head 78 of the bolt, and a wing nut 79 on the outer free end of the bolt are shown slightly spaced outwardly from the respective wing portions, and the bolts extend through holes in the wing portions, providing a generous tolerance therein for the bolts.

The slitted tube 73 may consist of thin springy sheet material, while the glide shoe members may consist of a material having minimum fractional affinity relative to the rubber tracks on the filter belt. A composition known as "Teflon" has been found to be well suited for that purpose, as already stated above. By reason of the resiliency of the wing portions 71 and 72, the glide shoes will spread apart and release the filter belt when excessive stretching force develops.

Also, the tube member may be of a material of suitable plastic composition integral with or bonded to the glide shoe members which in turn may have minimum fractional affinity relative to the tracks. Also, many cross-sectional shapes other than that of the slitted tube may be employed, and many other variations in the structural combination of the parts that constitute a springy clasp construction or the like designed to cooperate with the tracks on the filter belt.

Other embodiments featuring yieldable wing portions having glide shoes engaging the belt, are exemplified in FIGS. 10 to 14.

The embodiment in FIG. 10 differs from the construction shown in FIG. 6 only in the manner of mounting the glide shoe members on the resiliently yieldable belt gripping wing portions 80 and 81 of the device. Accordingly, a shaft 82 extends coaxially through a cylindrical glide shoe member 82, which shaft is end-wise supported in a pair of sleeves 83a and 83b fixed to the respective wing portion.

In FIGS. 11 and 12, a body portion or plate 84 is fixed to a rod 85 which is slidable as well as turnable in a fixed sleeve 85a substantially the same as sleeve 36 in FIGS. 2 and 3 described above. A pair of wing members 86 and 87 of resiliently yieldable sheet material each have a hinge connection with plate 84 by means of hinge shafts 88 and 89 respectively. The outer ends of the wing members have mounted thereon glide shoe members 90 and 91. A pair of bolts or threaded rods 92 and 93 extend transversely through the wing members each end of each bolt being adjustably secured to the respective wing members by means of a pair of lock nuts 94 and 95. Slots 96 in each wing member permit each bolt to be adjusted parallel to itself for varying the resiliency of the wing members.

If desired, a leaf spring 97 may be interposed between the outer lock nut and the respective wing member for somewhat stiffening the wing member, or decrease its resiliency. A slot 98 in this leaf spring may be provided to allow it to be shifted forward or backward in a manner to vary the resiliency of the wing member. Each wing member is shown to have a cutout 99.

In the embodiment of FIGS. 13 and 14, the body portion is in the form of a block 100 mounted upon the reduced end portion 101 of a rod 102, so that the block is turnable about the reduced end portion of the rod. A retainer pin or wing 102a keeps the block longitudinally positioned. The rod 102 itself is longitudinally slidable but non-rotatable in a fixed sleeve 103. A pair of opposedly arranged wing members 104 and 105 of resiliently yieldable sheet material are fixed to the respective upper and lower faces of the body portion or block. Glide shoe members 106 and 107 are mounted upon the outer ends of these wing members substantially the same as in FIG. 11. The wing members 104 and 105 in their untensioned condition may assume the shape indicated in dot-and-dash in FIG. 11. A pair of bolts 108 and 109 extending transversely through the wing members with nuts 110 will keep the glide shoe members in contact with the edge portion of the filter belt.

However, the resilient nature of the free end portions of the wing members will allow them to yield and spread apart from each other so as to release the filter belt in case an excessive transverse stretching force should develop due to excessive lateral deviation of the belt. Each wing member is shown to have a cutout 111.

From the foregoing it will be seen that the present invention provides a pair of oppositely arranged devices for applying transverse stretch to the filter belt, constructed to cooperate smoothly with prepared edge portions of the filter belt while eliminating undue wear and tear effects, with a pair of stress distributing glide shoes of each device engaging the beaded guide track strip element of the belt, and with respective spring pressure or bias devices urging the guide shoe members towards each other, as well as laterally away from the filter belt. The invention also provides simple, practical, and highly effective locking devices for securing the ends of rubber track strip elements to one another.

It will furthermore be understood that each of the elements, or two or more together, may also find useful application in other types of filters and filter belts.

While the invention has been illustrated and described as embodied in a vacuum drum filter having a traveling filter belt or cake discharge over a discharge roll, it is not intended to be limited to the details shown since various modifications and structural changes may be made without department from the spirit of the present invention.

What is claimed is:

1. An endless filter belt for a rotary drum filter, which comprises a length of porous filter web material the ends of which are connected to one another, a strip element of homogeneous flexible material, which has a flange portion lengthwise secured to a lateral edge of said filter web along the length thereof, and an enlarged head portion providing a bead having a pair of oppositely arranged track faces extending along the length of said flange portion at each side thereof at the juncture of said flange portion with said head portion, and locking means for interconnecting the mutually adjoining end portions of said bead, comprising a centering pin extending longitudinally into the mutually adjoining ends of said head portion, whereby said ends are aligned with one another, and locking means comprising a U-shaped locking wire having a pair of shank portions transversely penetrating respective end portions of said bead, as well as through respective end portions of the centering pin.

2. An endless filter belt for a rotary drum filter, which comprises a length of porous filter web material the ends of which are connected to one another, a strip element of homogeneous flexible material, which has a flange portion lengthwise secured to a lateral edge of said filter web along the length thereof, and an enlarged head portion providing a bead having a pair of oppositely arranged track faces extending along the length of said flange portion at each side thereof at the juncture of said flange portion with said head portion, and locking means for interconnecting the mutually adjoining end portions of said bead, comprising a centering pin extending longitudinally into the mutually adjoining ends of said head portion, whereby said ends are aligned with one another, and locking means comprising a U-shaped locking wire having a pair of shank portions transversely penetrating respective end portions of said bead, with the addition of a connector plate of thin and flexible material fastened to the flange portion of the strip element across the mutually abutting ends thereof, on the outward facing side of the filter belt.

3. The filter belt according to claim 1, wherein the shank portions of the locking wire have inwardly turned-in terminal portions sunk into the material of the bead.

References Cited

UNITED STATES PATENTS

| 886,215 | 4/1908 | Hudson | 24—31 |
|---|---|---|---|
| 1,330,239 | 2/1920 | Chantrell | 24—31 B |
| 1,259,360 | 3/1918 | Cerpial | 24—31 B |
| 3,245,276 | 4/1966 | Wall | 24—31 RX |
| 3,288,298 | 11/1966 | Daugherty et al. | 210—401 |
| 3,461,733 | 8/1969 | Peterson | 24—31 X |

FOREIGN PATENTS 4,598  3/1905  Great Britain.

REUBEN FRIEDMAN, Primary Examiner

T. A. GRANGER, Assistant Examiner